United States Patent [19]

Overman, III et al.

[11] Patent Number: 5,011,637
[45] Date of Patent: Apr. 30, 1991

[54] PREPARING CELLULOSE ESTER MEMBRANES FOR GAS SEPARATION

[75] Inventors: Dana C. Overman, III, Vallejo; Jee I. Kau, Concord; Robert D. Mahoney, Danville, all of Calif.

[73] Assignee: The Dow Chemical Company, Midland, Mich.

[21] Appl. No.: 301,000

[22] Filed: Jan. 23, 1989

[51] Int. Cl.$^5$ .......................... B29C 67/20; D01F 2/02
[52] U.S. Cl. ...................... 264/41; 264/561; 264/200; 264/203; 264/207; 264/209.1; 264/211.11; 264/211.15; 264/211.16; 264/211.19; 55/16
[58] Field of Search ............... 264/41, 49, 561, 209.1, 264/200, 203, 207, 211.11, 211.15, 211.16, 211.19; 210/500.2; 55/16

[56] References Cited

U.S. PATENT DOCUMENTS

| | | | |
|---|---|---|---|
| 3,129,159 | 4/1964 | Maier et al. | 204/180 |
| 3,423,491 | 1/1969 | McLain et al. | 264/49 |
| 3,483,282 | 12/1969 | Manijikian | 264/49 |
| 3,497,072 | 2/1970 | Cannon | 264/49 |
| 3,546,209 | 12/1970 | Lipps | 536/58 |
| 3,567,809 | 3/1971 | Ueno et al. | 264/41 |
| 3,592,672 | 7/1971 | Rowley et al. | 264/41 |
| 3,593,855 | 7/1971 | Stana | 210/500 |
| 3,646,179 | 2/1972 | Stana | 264/41 |
| 3,772,072 | 11/1973 | Brown et al. | 264/41 |
| 3,773,534 | 11/1973 | Kaiser et al. | 264/49 |
| 3,780,147 | 12/1973 | Stana | 264/41 |
| 3,878,276 | 4/1975 | Hoernschemeyer | 264/41 |
| 3,883,626 | 5/1975 | Kamide et al. | 264/41 |
| 3,909,279 | 9/1975 | Manijikian | 106/180 |
| 3,957,935 | 5/1976 | Staude | 264/41 |
| 4,026,978 | 5/1977 | Mungle et al. | 264/41 |
| 4,147,622 | 4/1979 | Nussbaumer | 264/41 |
| 4,243,701 | 1/1981 | Riley et al. | 264/41 |
| 4,276,173 | 6/1981 | Kell et al. | 264/200 |
| 4,342,711 | 8/1982 | Joh et al. | 264/209.1 |
| 4,543,221 | 9/1985 | Chew et al. | 264/41 |
| 4,587,168 | 5/1986 | Miyagi et al. | 428/369 |
| 4,609,728 | 9/1986 | Spranger et al. | 264/41 |
| 4,681,713 | 7/1987 | Miyagi et al. | 264/41 |
| 4,772,392 | 9/1988 | Sanders et al. | 264/41 |
| 4,838,904 | 6/1989 | Sanders et al. | 264/41 |

FOREIGN PATENT DOCUMENTS

| | | | |
|---|---|---|---|
| 53-82670 | 12/1976 | Japan . | |
| 58-84007 | 11/1981 | Japan . | |
| 58-98412 | 6/1983 | Japan | 264/561 |
| 3447626 | 12/1983 | Japan . | |
| 60-235852 | 5/1984 | Japan . | |
| 59-199807 | 11/1984 | Japan . | |
| 60-5202 | 1/1985 | Japan . | |

Primary Examiner—Jeffery Thurlow
Attorney, Agent, or Firm—Janet Pauline Clark

[57] ABSTRACT

This invention relates to a novel composition useful for preparing a semi-permeable cellulose ester gas separation membrane, which composition includes a mixture of a cellulose ester, a solvent selected from the group consisting essentially of glycerol acetate, glycerol diacetate, glycerol triacetate, and mixtures thereof, and optionally the non-solvent glycerol. This invention also relates to a process of fabricating a cellulose ester gas separation membrane from said composition.

10 Claims, 1 Drawing Sheet

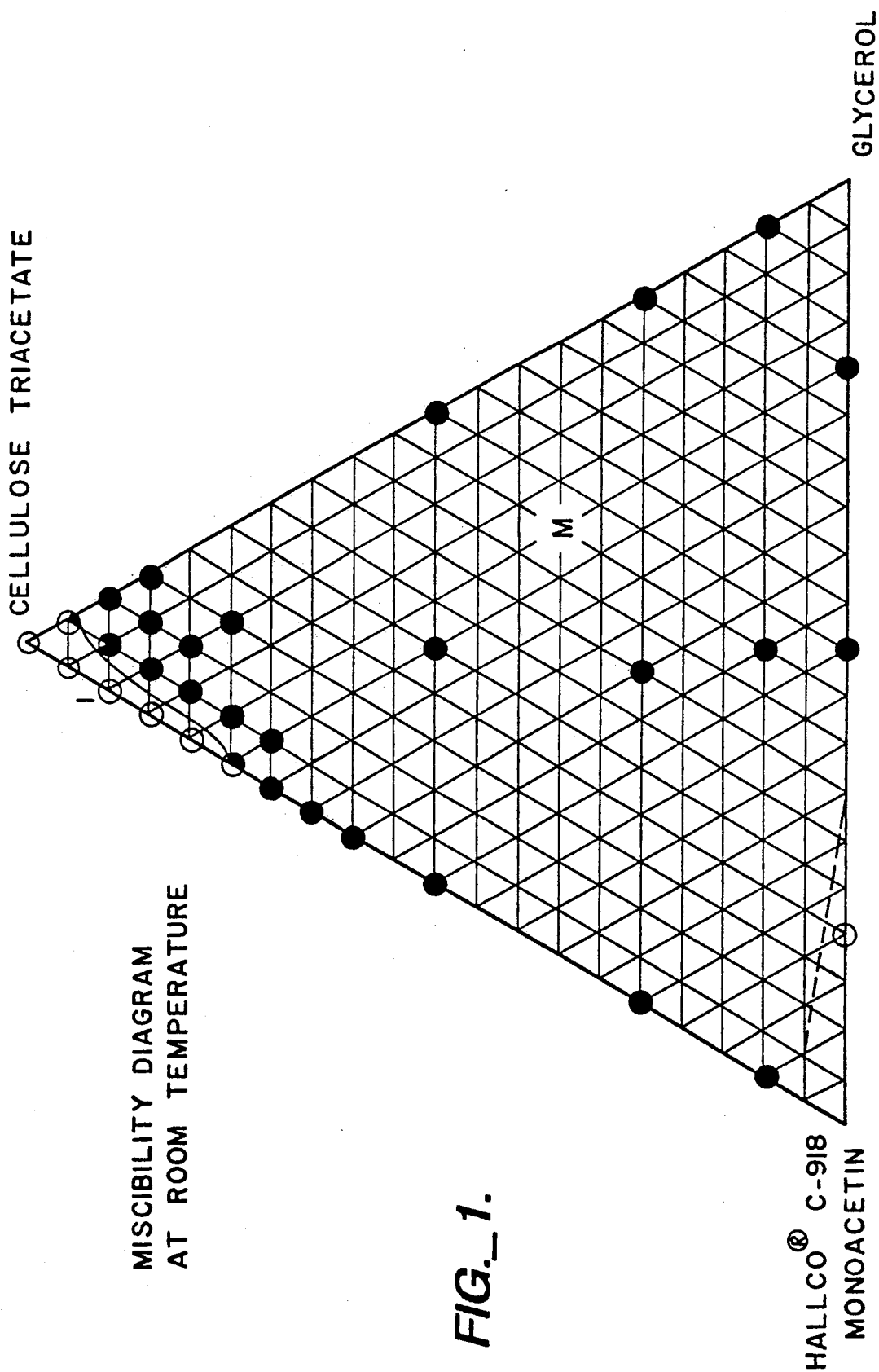

PREPARING CELLULOSE ESTER MEMBRANES FOR GAS SEPARATION

BACKGROUND OF THE INVENTION

This invention relates to a composition useful for preparing a semi-permeable cellulose ester membrane useful for gas separation. This invention further relates to a process utilizing said composition to prepare a semi-permeable cellulose ester membrane useful for gas separation.

Cellulose ester membranes have long been used to isolate or recover gases such as hydrogen, helium, oxygen, nitrogen, carbon dioxide, methane, light hydrocarbons, hydrogen sulfide, and water vapor from gas mixtures. Particular separations of interest include the separation of hydrogen or helium from natural gas and the separation of nitrogen or carbon dioxide from light hydrocarbons or other crude oil components as part of the tertiary oil recovery process. The dehydration of natural gas is another gas separation of interest. Other applications include the recovery of an enriched oxygen stream from air for use in enhanced combustion processes. Alternately, an enriched nitrogen stream may be obtained from air for use as an inert atmosphere over flammable fluids or for food storage or metal treating.

Typically, cellulose ester membranes are prepared by extruding, molding, or casting the membranes from blends containing a polymer, a solvent, and an optional non-solvent. Solvents are compounds in which the polymer substantially dissolves at the membrane fabrication temperature. Non-solvents are compounds in which the polymer is substantially insoluble at the membrane fabrication temperature. Solvents which have been used to prepare cellulose ester membranes include sulfolane, dimethylformamide, N-methylpyrrolidone, and acetone. Non-solvents used to prepare cellulose ester membranes include methanol, propanol, water, and maleic acid. Polyethylene glycol has been used as a non-solvent for cellulose triacetate. Such solvents and non-solvents are environmentally harmful and deleterious and once removed from the membranes during subsequent fabrication present problems of disposal or extensive repurification before reuse. Such solvents and non-solvents also present problems with respect to exposure of personnel to harmful and deleterious vapors and liquids during the membrane fabrication process.

What is needed are extrusion, molding, or casting compositions for cellulose esters in which the solvents and non-solvents are not harmful or deleterious.

SUMMARY OF THE INVENTION

The invention is a novel composition useful for preparing a semi-permeable cellulose ester membrane which composition comprises a mixture of:
  i. at least one cellulose ester,
  ii. at least one solvent selected from the group consisting essentially of glycerol monoacetate, glycerol diacetate, glycerol triacetate, and mixtures thereof, in an amount itself sufficient to solubilize the cellulose ester at the membrane formation temperature, and
  iii. optionally, the non-solvent glycerol;
wherein the ratio of cellulose ester, solvent, and optional non-solvent is such that the mixture can be formed into a semi-permeable membrane useful for gas separation.

In another aspect, this invention is a process for preparing a semi-permeable cellulose ester membrane from the above-cited composition, which process comprises:
A. forming a mixture comprising:
  i. at least one cellulose ester,
  ii. at least one solvent selected from the group consisting essentially of glycerol monoacetate, glycerol diacetate, glycerol triacetate, and mixtures thereof, in an amount itself sufficient to solubilize the cellulose ester at the membrane formation temperature, and
  iii. optionally, the non-solvent glycerol;
B. heating the mixture to a temperature at which the mixture becomes a homogeneous fluid;
C. extruding, molding, or casting the homogeneous fluid into a semi-permeable membrane;
D. passing the membrane through one or more quench zones wherein the membrane gels and solidifies;
E. passing the membrane through one or more leach and/or anneal zones in which at least a portion of the solvent and optional non-solvent is removed from the membrane: and
F. optionally, drying the membrane;
wherein the semi-permeable membrane so formed is useful for gas separation.

BRIEF DESCRIPTION OF THE DRAWING

FIG. 1 illustrates a miscibility diagram for cellulose triacetate, HALLCO® C-918 Monoacetin (®trademark of C.P. Hall Company), and glycerol blends at room temperature and pressure.

DETAILED DESCRIPTION OF THE INVENTION

This invention consists of a composition useful for forming a cellulose ester membrane comprising a mixture of at least one cellulose ester, at least one solvent selected from the group consisting essentially of glycerol monoacetate, glycerol diacetate, glycerol triacetate, and mixtures thereof, in an amount itself sufficient to solubilize the cellulose ester at the membrane formation temperature, and optionally the non-solvent glycerol; wherein the ratio of cellulose ester, solvent, and optional non-solvent is such that the composition can be formed into a semi-permeable membrane useful for gas separation.

Cellulose esters and their synthesis are well known in the art. See "Cellulose Esters, Organic," *Encyclopedia of Polymer Science and Engineering*, 2nd edition, Vol. 3, Wiley Interscience, New York, 1985, pp. 158–226, the relevant portions relating to polymer synthesis incorporated herein by reference. Preferred cellulose esters useful in this invention include cellulose acetate, cellulose propionate, cellulose butyrate, cellulose nitrate, cellulose methacrylate, cellulose phthalate, and mixtures thereof. Mixed cellulose esters such as cellulose acetate propionate, cellulose acetate butyrate, and cellulose acetate methacrylate are also included within the scope of the invention. The term "mixed cellulose esters" refers to cellulose esters in which the polymer backbone contains at least two different cellulose ester moieties. Mixed cellulose esters are thus distinct from physical mixtures or blends of two or more different cellulose esters. Cellulose esters which are more preferred for use in this invention include the cellulose acetates, commonly referred to as cellulose acetate, cellulose diacetate, cellulose triacetate, and mixtures thereof. The cellulose acetates possess different acetyl contents depending on the degree of substitution. The acetyl content ranges from about 11.7 weight percent for a degree of substitution of 0.5 to about 44.8 weight percent for a degree of substitution of 3.0. Cellulose diacetate, with an acetyl content of from about 32.0 to about 41.0 weight percent, and cellulose triacetate, with an acetyl content of from about 41.0 to about 44.8 weight percent, and mixtures thereof are even more preferred for use in this invention. Especially preferred for use in this invention is cellulose triacetate with an acetyl content of from about 41.0 to about 44.8 weight percent.

Preferred solvents for use in this invention include glycerol acetate, glycerol diacetate, glycerol triacetate, and mixtures thereof. More preferred solvents include glycerol monoacetate, glycerol diacetate, and mixtures thereof. The solvents useful in this invention may optionally contain small amounts of inert compounds, inhibitors, stabilizers, or other additives which do not adversely affect the membrane forming ability of the composition. Preferably the presence of these minor impurities in the solvent is less than about 15 weight percent, more preferably less than about 5 weight percent.

The optional non-solvent preferred in this invention is glycerol.

The concentrations of the components in the extrusion, molding, or casting composition may vary. Miscibility of the composition at the extrusion, molding, or casting temperature is one factor to be considered in forming the extrusion, molding, or casting composition. Miscibility of polymer solutions may be readily determined empirically by methods known in the art.

The concentration of the components in the composition is also dependent upon the membrane formation process used, that is, extrusion, molding, or casting, whether the membrane to be produced possesses homogeneous, asymmetric, or composite structure, and whether the membrane is fabricated into flat sheet, tubular, or hollow fiber form.

Homogeneous membranes consist of a thin, continuous discriminating layer which is dense and free of voids and pores. Such membranes generally possess the same structure and composition throughout the membrane. Asymmetric membranes consist of a thin, continuous, dense discriminating layer on one or both sides of the membrane, wherein the discriminating layer is supported by a porous layer of the same material as the discriminating layer, wherein the porous layer does not significantly impede the transport of the fluid containing components to be separated by the discriminating layer. Composite membranes consist of a thin, continuous, dense discriminating layer on one or both sides of the membrane, wherein the discriminating layer is supported by a porous layer of a different material than the discriminating layer, wherein the porous layer does not significantly impede the transport of the fluid containing components to be separated by the discriminating layer. Asymmetric and composite membrane structures are preferred membrane structures produced in accordance with this invention.

Homogeneous, asymmetric, and composite membranes may be fabricated into flat sheet, tubular, or hollow fiber form by casting, molding, or extrusion. Hollow fiber and flat sheet form are preferred membrane configurations produced in accordance with this invention.

The concentration of cellulose ester is preferably at least about 10 weight percent, more preferably at least about 15 weight percent; the concentration of cellulose ester is preferably less than about 80 weight percent, more preferably less than about 70 weight percent. The concentration of the solvent (glycerol monoacetate/glycerol diacetate/glycerol triacetate/ and mixtures thereof) is prefereably at least about 15 weight percent, more preferably at least about 20 weight percent, even more preferably at least about 30 weight percent: the concentration of solvent is preferably less than about 90 weight percent, more prefereably less than about 85 weight percent, even more preferably less than about 75 weight percent. The concentration of the optional non-solvent (glycerol) is preferably from about 0 to about 30 weight percent, more preferably from about 0 to about 20 weight percent.

In the case of casting, a homogeneous blend is prepared which possesses a suitable viscosity for casting at a given temperature. For casting, the concentration of cellulose ester is preferably at least about 10 weight percent, more preferably at least about 15 weight percent; the concentration of cellulose ester is preferably less than about 75 weight percent, more preferably less than about 65 weight percent. The casting blend may be cast at room temperature or at elevated temperatures depending upon the viscosity of the blend. The blend is preferably cast at a temperature of from about 20° to about 200° C.

A homogeneous membrane may be cast into flat sheet form by pouring the blend onto a smooth support surface and drawing down the blend to an appropriate thickness with a suitable tool such as a doctor blade or casting bar. Alternately, the blend may be cast in a continuous process by casting the blend onto endless belts or rotating drums. The casting surface may be such that the finished membrane may thereafter be readily separated from the surface. For example, the membrane may be cast onto a support having a low surface energy, such as silicon, coated glass, or metal, or a surface to which the membrane will not adhere. The blend may also be cast onto the surface of a liquid with which the polymer is immiscible, such as water or mercury. Alternately, the blend may be cast onto a support surface which may thereafter be dissolved away from the finished membrane.

The cast blend is thereafter exposed to curing conditions to remove the solvent, thereby leaving a thin, continuous, dense discriminating layer of polymer which is homogeneous. The blend can be dried or cured by either exposing the solution to a vacuum, by exposing the blend to elevated temperatures, by allowing the solvent to evaporate from the solution over time, or a combination thereof. Generally it is preferable to expose the cast blend to elevated temperatures, that is, temperatures above ambient. Any temperature at which the solvent evaporates in a reasonable period of time and which is below the glass transition temperature of the membrane is operable. The drying or curing temperature is preferably less than about 120° C., more preferably less than about 80° C. In one preferred embodiment, drying or curing is conducted under vacuum at such elevated temperatures. Such drying or curing is performed over a period sufficient to remove the solvent, preferably at least about 1 hour.

A composite flat sheet, tubular, or hollow fiber membrane may be obtained by similarly casting the blend solution onto a permanent non-porous or porous membrane support which is in flat sheet, tubular, or hollow fiber form. Preferably the support is porous so that the support presents minimal resistance to transport of the components to be separated through the composite membrane. Penetration of the casting blend into the pores of the porous support layer is operable so long as the desired thickness of the membrane is not exceeded. In one embodiment, the support layer may be a metal or polymeric plate with a plurality of holes drilled through it. However, such a drilled plate is not advantageous because it can significantly reduce the effective surface area of the membrane. In a preferred embodiment, the porous support layer is a very porous polymeric membrane. Any polymeric material to which the cellulose ester discriminating layer will adhere, which possesses sufficient mechanical properties under membrane use conditions, and which does not unduly interfere with transport of the components to be separated through the composite membrane may be used. Preferred support materials for composite membranes include cellulose esters, polysulfones, polyethersulfones, polyolefins, polycarbonates, polyimides, polyetheretherketones (PEEK), and the like. Illustrative of such polymeric support layers are microporous cellulose ester and microporous polysulfone membranes. Such membranes are commercially available under the tradenames MILLIPORE, PELLICON, and DIAFLOW. Where such support membranes are thin or highly deformable, a screen or other support means may also be employed to adequately support the semi-permeable membranes. Once the cellulose ester discriminating layer is cast onto the permanent support, the membrane is cured under conditions similar to that hereinbefore described for homogeneous flat sheet membranes in order to produce the thin, continuous, dense discriminating layer.

Asymmetric flat sheet membranes may also be obtained by the casting method. Such membranes are cast as described hereinbefore with respect to homogeneous flat sheet membranes but are subsequently quenched, leached and/or annealed as described hereinafter for asymmetric membranes formed by the extrusion process.

In the case of molding, a homogeneous blend is prepared which possesses a suitable viscosity for molding at a given temperature. For molding, the concentration of cellulose ester is preferably at least about 25 weight percent, more preferably at least about 35 weight percent; the concentration of cellulose ester is preferably less than about 80 weight percent, more preferably less than about 75 weight percent. The molding blend may be molded at room temperature or at elevated temperatures depending upon the viscosity of the blend. The blend is preferably molded at a temperature of from about 20° to about 200° C.

Flat sheet homogeneous membranes may be obtained by conventional molding techniques, as for example, molding flat sheets from the molding blends by compressing between flat plates.

Extrusion is a preferred membrane formation process for the fabrication of flat sheet, tubular, or hollow fiber membranes. In the case of extrusion, the components of the extrusion composition may be combined prior to extrusion by mixing in any convenient manner with conventional mixing equipment, as for example in a Hobart mixer. Alternatively, the extrusion composition may be homogenized by extruding the mixture through a twin screw extruder, cooling the extrudate, and grinding or pelletizing the extrudate to a particle size readily fed to a single or twin screw extruder. The components of the extrusion composition may also be combined directly in a melt-pot or twin screw extruder and extruded into membranes in a single step.

The viscosity of the mixture must not be so high that the mixture is too viscous to extrude at temperatures which do not deleteriously affect the polymer: on the other hand, the viscosity must not be so low that the mixture does not maintain its desired shape upon exiting the extrusion die. For extrusion, the concentration of cellulose ester is preferably at least about 25 weight percent, more preferably at least about 35 weight percent; the concentration of cellulose ester is preferably less than 80 weight percent, more preferably less than about 70 weight percent.

The mixture prior to extrusion is heated to a temperature which results in a homogeneous fluid possessing a viscosity suitable for extrusion. The temperature should not be so high as to cause significant degradation of the cellulose ester. The temperature should not be so low as to render the fluid too viscous to extrude. The extrusion temperature is preferably at least about 20° C., more preferably at least about 25° C.; the extrusion temperature is preferably less than about 250° C., more preferably less than about 220° C.

The mixture of polymer, solvent, and optional non-solvent is extruded through a sheet, hollow tube, or hollow fiber die (spinnerette). Hollow fiber spinnerettes typically are multi-holed and thus produce a tow of multiple hollow fibers. The hollow fiber spinnerettes include a means for supplying fluid to the core of the extrudate. The core fluid is used to prevent the collapsing of the hollow fibers as they exit the spinnerette. The core fluid may be a gas such as nitrogen, air, carbon dioxide, or other inert gas or a liquid which is a non-solvent for the polymer such as water or glycerol.

Homogeneous flat sheet, tubular, or hollow fiber membranes may be produced by extruding the extrusion blend through the appropriate die and then drying or curing the membrane as hereinbefore described with respect to cast homogeneous membranes.

To form asymmetric membranes, the extrudate exiting the die enters one or more quench zones. The environment of the quench zone may be gaseous or liquid. Within the quench zone, the extrudate is subjected to cooling to cause gelation and solidification of the membrane. In a preferred embodiment, the membranes are first quenched in air. Within the quench zone, the membranes gel and solidify. A portion of the solvent and optional non-solvent evaporates and the membrane pore structure begins to form. The temperature of the air zone is preferably at least about 10° C., more preferably at least about 20° C.; the temperature of the air zone is preferably less than about 100° C., more preferably less than about 80° C. The residence time in the air zone is preferably less than about 180 seconds, more preferably less than about 30 seconds, even more preferably less than about 10 seconds. Shrouds may be used to help control air flow rates and temperatures in the air quench zone.

Following or instead of the air quench, the membranes may optionally be quenched in a liquid which is substantially a non-solvent for the polymer such as water or a mixture of water and the glycerol acetate solvents and/or the non-solvent glycerol. The temperature of the liquid quench zone is preferably at least about 2° C.; the temperature of the liquid quench zone is preferably less than about 30° C., more preferably less than about 10° C., even more preferably less than about 6° C. The residence time in the liquid quench zone at the liquid quench temperature should be sufficient to gel and solidify the membranes. The residence time in the quench liquid is preferably at least about 0.1 seconds, more preferably at least about 0.5 seconds.

Following quenching, the membranes are passed through at least one leach and/or anneal zone containing a liquid which is substantially a non-solvent for the polymer such as water or a mixture of water and the glycerol acetate solvents and/or the non-solvent glycerol to remove at least a portion of the solvent and optional non-solvent. The leach bath need not remove all of the solvent and optional non-solvent from the membrane. The minimum temperature of the leach bath is such that removal of the solvent and optional non-solvent from the membrane occurs at a reasonable rate. The minimum temperature of the leach bath is preferably at least about 10° C., more preferably at least about 20° C. The maximum temperature of the leach bath is below that temperature at which membrane integrity is deleteriously affected. The temperature of the leach bath is preferably less than about 90° C., more preferably less than about 80° C. The residence time in the leach bath is preferably at least about 0.5 minutes, more preferably at least about 1.0 minutes.

The membranes may be drawn down to the desired size prior to entrance into the leach bath, during the residence time in the leach bath, subsequent to exiting the leach bath, or a combination thereof. The fibers or films are optionally drawn down using godets or other conventional equipment to the appropriate size. Line speeds are not generally critical and may vary over a wide range. Minimum preferred line speeds are at least about 10 feet per minute, more preferably at least about 100 feet per minute; maximum preferred line speeds are less than about 1000 feet per minute, more preferably less than about 500 feet per minute.

Following leaching and/or annealing, the membranes are preferably dried before use in a gas separation process. The membranes may be dried before or after fabrication into devices. If the membranes are dried subsequent to assembly into a device, such a device design should allow sufficient tolerance for shrinkage of the membrane upon drying. Cellulose ester membranes generally should not be directly air dried without pretreatment because direct air drying causes adverse structural changes such as cracking or pore collapse which adversely affect membrane performance. Therefore, the membranes are generally pretreated prior to drying by contacting the membrane either simultaneously or sequentially with a series of polar and nonpolar solvents. Thereafter, the membranes may be dried in air or an inert gas such as nitrogen. The air or inert gas used to dry the membrane should have a low enough initial water content so that drying of the membrane takes place at reasonable rates. Room air is a suitable and convenient source for drying the membrane. The membranes may be dried at temperatures at which drying takes place at a reasonable rate and which do not adversely affect the membrane. The drying temperature is preferably at least about 10° C., more preferably at least 20° C. The drying temperature is preferably less than about 80° C., more preferably less than about 50° C. The drying time is preferably at least about 1 hour, more preferably at least about 3 hours. The membrane may be dried under reduced pressures. Alternatively, the membrane may be freeze dried. See U.S. Pat. Nos. 3,592,672; 3,773,534; 3,842,515; 3,957,935; 4,068,387; 4,080,743; 4,127,625; 4,430,807; the relevant portions incorporated herein by reference.

Since the gas transport rate through the membrane is inversely proportional to the membrane thickness, the discriminating layer of the membrane is preferably as thin as possible while possessing adequate mechanical strength under use conditions and good separation characteristics. Overall thickness of the membrane should be thick enough to provide sufficient mechanical strength under membrane use conditions but not so thick as to significantly reduce the transport rate through the membrane. The discriminating layer must not be so thin as to contain substantial defects which disrupt the continuity of the discriminating layer so that separation of components cannot be achieved. The overall membrane thickness for homogeneous membranes is preferably at least about 5 microns, more preferably at least about 20 microns; the overall membrane thickness for homogenous membranes is preferably less than about 100 microns, more preferably less than about 50 microns. Asymmetric membranes will preferably have a discriminating layer of less than about 5.0 microns, more preferably less than about 1.0 micron, most preferably less than about 0.2 microns, with a thicker porous support layer. The support layer in asymmetric membranes is preferably at least about 20 microns in thickness, more preferably at least about 50 microns in thickness; the porous support layer is preferably less than about 500 microns, more preferably less than about 200 microns, most preferably less than about 150 microns. Preferably composite membranes will have a discriminating layer of cellulose ester which is less than about 5.0 microns, more preferably less than about 1.0 micron, most preferably less than about 0.2 microns cast, coated, or laminated onto a porous or nonporous support. The support layer in composite membranes preferably is at least about 20 microns, more preferably at least about 50 microns; the support layer is preferably less than about 500 microns, more preferably less than about 200 microns. In the case of homogeneous, asymmetric, or composite hollow fibers, the outside diameter/inside diameter ratio is preferably at least about 1.5, more preferably at least about 2.0: the outside diameter/inside diameter ratio of such hollow fibers is preferably less than about 4.0, more preferably less than about 3.0.

Tubesheets are affixed to the cellulose ester membranes by techniques known in the art. Methods of tubesheet formation and suitable tubesheet materials are disclosed in U.S. Pat. Nos. 3,339,431; 3,619,459; 3,722,695; 3,728,425; 3,755,034; and 4,138,460; the relevant portions incorporated herein by reference. When the membrane device is fabricated from water-wet membranes, the tubesheet material used must adhere sufficiently to the membrane so that the bond between the membrane and the tubesheet will be maintained under conditions of fabrication and use. Preferred tubesheet materials for water-wet membranes of cellulose esters include compositions containing mixtures of a diglycidyl ether of a dihydroxybenzene and a polyglycidyl ether of a polyhydric phenol cured with near stoichiometric amounts of polyamine or polyamide epoxy curing agents.

The membranes are fabricated into flat sheet, spiral, tubular, or hollow fiber devices by methods described in the art. Spiral wound and hollow fiber devices are preferred. The membranes are sealingly mounted in a pressure vessel in such a manner that the membrane separates the vessel into two fluid regions wherein fluid flow between the two regions is accomplished by fluid permeating through the membrane. For examples of conventional membrane device designs and fabrication procedures, see U.S. Pat. Nos. 3,228,876; 3,433,008; 3,455,460; 3,475,331; 3,526,001; 3,538,553; 3,690,465; 3,702,658; 3,755,034; 3,801,401; 3,872,014; 3,966,616; 4,045,851; 4,061,574; 4,080,296; 4,083,780; 4,220,535; 4,235,723; 4,265,763; 4,430,219; 4,352,092; 4,337,139; and 4,315,819; the relevant portions incorporated by reference.

The membranes are used to isolate or recover gases from gas mixtures. The feed gas mixtures may contain gases such as hydrogen, helium, oxygen, nitrogen, carbon dioxide, methane, light hydrocarbons, hydrogen sulfide, water vapor, and the like. The membrane divides a separation chamber into two regions, a higher pressure side into which the feed mixture is introduced and a lower-pressure side. One side of the membrane is contacted with a feed gas mixture under pressure, while a pressure differential is maintained across the membrane. To be useful, at least one of the components in any given gas mixture selectively passes through the membrane more rapidly than the other component or components in the mixture. A stream is obtained on the low pressure side of the membrane which is enriched in at least one faster permeating component. The permeated gas is removed from the low pressure (downstream) side of the membrane. A stream depleted in at least one faster permeating gas is withdrawn from the high pressure (upstream) side of the membrane.

The separation process should be carried out at pressures which do not adversely affect the membrane, that is, pressures which do not cause the membrane to mechanically fail. In the embodiment in which carbon dioxide is separated from methane, the pressure differential across the membrane is preferably between about 50 and about 1500 psig, more preferably between about 100 and 1500 psig. The separation process should be carried out at temperatures which do not adversely affect membrane integrity. Under continuous operation, the operating temperature is preferably in the range of from about $-20°$ to about $50°$ C., more preferably from about $-10°$ to about $30°$ C. Gas permeability is defined as $$P = \frac{(\text{amount of permeant})(\text{membrane thickness})}{(\text{area})(\text{time})(\text{driving force across the membrane})}.$$

A standard permeability measurement unit is the Barrer, which is equal to $$1 \times 10^{-10} \frac{(\text{centimeter})^3(\text{STP})(\text{centimeter})}{(\text{centimeter})^2(\text{second})(\text{centimeter Hg})}$$

abbreviated hereinafter as $$1 \times 10^{-10} \frac{\text{cm}^3(\text{STP})\text{cm}}{\text{cm}^2 \text{ sec cmHg}}.$$

The reduced flux is defined as (permeability)÷(membrane thickness). A standard reduced flux unit is $$1 \times 10^{-5} \frac{(\text{centimeter})^3(\text{STP})}{(\text{centimeter})^2(\text{second})(\text{centimeter Hg})}$$

abbreviated hereinafter as $$1 \times 10^{-5} \frac{\text{cm}^3(\text{STP})}{\text{cm}^2 \text{ sec cmHg}}.$$

The separation factor (selectivity) is defined as the ratio of the permeability or flux of the faster permeating gas to the permeability or flux of the slower permeating gas.

In the embodiment where carbon dioxide is separated from methane, the membrane preferably has a separation factor for carbon dioxide/methane at about $25°$ C. of at least about 10 or greater, more preferably of at least about 20 or greater. The reduced flux for carbon dioxide is preferably at least about $$1.0 \times 10^{-5} \frac{\text{cm}^3(\text{STP})}{\text{cm}^2 \text{ sec cmHg}}$$

or greater, more preferably at least about $$5.0 \times 10^{-5} \frac{\text{cm}^3(\text{STP})}{\text{cm}^2 \text{ sec cmHg}}$$

or greater.

The membranes of this invention are fabricated from solvents and non-solvents which are not harmful or deleterious. This aspect of the invention eliminates problems of disposal or repurification of solvents and non-solvents before reuse. Since the solvents and non-solvents used are not harmful or deleterious, problems of exposure of personnel to harmful and deleterious vapors during the membrane fabrication process are minimized.

SPECIFIC EMBODIMENTS

The following examples are presented to illustrate the invention only and are not intended to limit the scope of the invention or claims.

EXAMPLE 1

Miscibility Diagram for Cellulose Triacetate/HALLCO ® C-918 Monoacetin/Glycerol Blends A miscibility diagram for cellulose triacetate, HALLCO ® C-918 Monoacetin (®trademark of C.P. Hall Company), and glycerol blends is shown in FIG. 1. The diagram is constructed by determining the miscibility of various compositions of the three components at room temperature and pressure.

Cellulose triacetate with an acetyl content of about 44 weight percent is obtained from Daicel Chemical. HALLCO ® C-918 Monoacetin is obtained from the C.P. Hall Company. HALLCO ® C-918 Monoacetin is not a pure compound but is a mixture of glycerol acetates and glycerol. Analysis by gas phase chromatography gives the following lot composition for HALLCO ® C-918 Monoacetin:

| HALLCO ® C-918 Monoacetin | Composition (Area Percent) |
|---|---|
| Glycerol Monoacetin | 50.0 |
| Glycerol Diacetin | 28.8 |
| Glycerol Triacetin | 1.9 |
| Glycerol | 19.2 |
| Glycerol is obtained from J. T. Baker Chemical Company. | |

Solutions of various compositions of the three components are prepared in 2,2,2-trifluoroethanol. Drops of each solution are placed on a microscope slide, the 2,2,2-trifluoroethanol evaporated, and the resulting film microscopically examined with a polarizing microscope equipped with phase contrast objectives and a phase contrast condenser. Films from compositions within the boundaries of the areas labeled "1" in FIG. 1 exhibited single phase characteristics; films from compositions within the boundaries of the area labeled "M" exhibited multi-phase characteristics.

EXAMPLE 2

Gas Separation by Hollow Fibers Extruded from Cellulose Triacetate/Hallco ® C-918 Monoacetin and Cellulose Triacetate/Hallco ® C-491 Diacetin Blends Hollow fiber cellulose triacetate (CTA) membranes are spun from various blend compositions containing cellulose triacetate, glycerol monoacetate, and glycerol diacetate via conventional spinning processes. The cellulose triacetate is obtained from Daicel Chemical Industries Ltd. under the product designation Cellulose Triacetate Flakes. The glycerol monoacetate is obtained from C.P. Hall under the product designation Hallco ® C-918 Monoacetin. Hallco ® C-918 Monoacetin is not a pure compound, but a mixture of glycerol acetates and glycerol. Analysis by gas phase chromatography gives the following lot composition for Hallco ® C-918 Monoacetin:

| Hallco ® C-918 Monoacetin | Composition (Area Percent) |
|---|---|
| Glycerol Monoacetate | 46 |
| Glycerol Diacetate | 29 |
| Glycerol Triacetate | 5 |
| Glycerol | 20 |

The glycerol diacetate is obtained from C.P. Hall under the product designation Hallco ® C-491 Diacetin. Hallco ® C-491 Diacetin is not a pure compound, but a mixture of glycerol acetates and glycerol. Analysis by gas phase chromatography gives the following lot composition for Hallco ® C-491 Diacetin:

| Hallco ® C-491 Diacetin | Composition (Area Percent) |
|---|---|
| Glycerol Diacetate | 49 |
| Glycerol Monoacetate | 24 |
| Glycerol Triacetate | 24 |
| Glycerol | 3 |

The blends are prepared by mixing the various components to form a tacky powder of plasticized CTA which is then extruded in a conventional single screw extruder. The hollow fibers are extruded, passed into air, quenched in water for about 3 seconds at about 4°–6° C., then leached in water at about 30° C. to remove most of the plasticizer. The fibers are then annealed at about 80° C. in water for about 90 seconds. The fibers are dried by first soaking the fibers in a mixture of about 50 volume percent isooctane and 50 volume percent isopropanol at room temperature for about 20 minutes prior to drying in air at room temperature for about 2 to 4 hours, followed by drying in a room temperature vacuum oven for about 4 hours.

After the fibers are dried, the fibers are assembled into devices for evaluation of gas permeation properties. The test device is a pressure vessel with four ports, two tubesheet ports, one feed port through which compressed gas enters the vessel, and an exit or purge port through which compressed gas leaves the vessel. 240 fibers about 140 to 170 microns in outer diameter are passed into one of the tubesheet ports and out the other tubesheet port allowing for about 27 centimeters length of fiber to be contained within the device. Epoxy tubesheets are formed in the two tubesheet ports to give a leak-tight bond between the fibers and the two ports.

The feed gas at room temperature and 50 psig is fed to the shellside of the device. The gas permeating through the walls of the hollow fibers to the lumen and out through the tubesheet ports is measured by means of a bubble or mass flowmeter. Gas separation data for carbon dioxide and methane are reported in Table II.

TABLE II

GAS SEPARATION PERFORMANCE

| Blend Composition (wt %) | | | Flux $10^{-5} \frac{cm^3(STP)}{cm^2 sec\ cmHg}$ | | Separation Factor $CO_2/CH_4$ |
|---|---|---|---|---|---|
| CTA | Hallco ® C-918 Monoacetin | Hallco ® C-491 Diacetin | $CO_2$ | $CH_4$ | |
| 40 | — | 60 | 2.42 | 0.076 | 31.8 |
| 40 | — | 60 | 2.28 | 0.070 | 32.5 |
| 40 | 10 | 50 | 2.18 | 0.064 | 34.1 |
| 40 | 10 | 50 | 2.82 | 0.085 | 33.2 |
| 37.5 | 10.42 | 52.08 | 8.62 | 0.300 | 28.7 |
| 37.5 | 10.42 | 52.08 | 7.30 | 0.230 | 31.7 |
| 40 | 10 | 50 | 4.67 | 0.154 | 30.3 |
| 40 | 10 | 50 | 4.58 | 0.154 | 29.7 |

What is claimed is:

1. A process for preparing a semi-permeable cellulose ester membrane, which process comprises the steps of:
    A. forming a non-harmful or non-deleterious mixture comprising:
        i. at least one cellulose ester, and
        ii. at least one non-harmful or non-deleterious solvent selected from the group consisting essentially of glycol monoacetate, glycerol diacetate, glycerol triacetate, and mixtures thereof, in an amount itself sufficient to solubilize the cellulose ester at the membrane fabrication temperature;
    B. heating the mixture to a temperature at which the mixture becomes a homogeneous fluid;
    C. extruding, molding, or casting the homogeneous fluid into the form of a semi-permeable membrane;
    D. passing the membrane through one or more quench zones wherein the membrane gels and solidifies; and
    E. passing the membrane through one or more leach zones, one or more anneal zones or a combination thereof in which at least a portion of the solvent and optional non-solvent is removed from the membrane;

wherein the semi-permeable membrane so formed is useful for gas separation.

2. The process of claim 1 which comprises the additional step of:
    F. drying the membrane.

3. The process of claim 2 wherein the mixture has a sufficient viscosity to allow extruding, molding, or casting of a semi-permeable membrane at a temperature at which the mixture is homogeneous.

4. The process of claim 3 wherein the mixture comprises by weight between about 10 and about 80 percent cellulose ester.

5. The process of claim 4 wherein the mixture comprises by weight between about 15 and 90 percent solvent.

6. The process of claim 5 wherein the cellulose ester is selected from the group consisting of cellulose acetate, cellulose diacetate, cellulose triacetate, and mixtures thereof.

7. The process of claim 6 wherein the cellulose ester membrane has a separation factor for carbon dioxide/methane of at least about 10.

8. The process of claim 7 wherein the cellulose ester membrane has a reduced flux for carbon dioxide of at least about $$1.0 \times 10^{-5} \frac{cm^3(STP)}{cm^2 \, sec \, cmHg}.$$

9. The process of claim 6 wherein the cellulose ester membrane is a hollow fiber.

10. The process of claim 6 wherein the cellulose ester membrane is asymmetric.

* * * * *